Oct. 4, 1932.     A. PARR     1,881,125
MACHINE OR DEVICE FOR APPLYING LABELS TO CYLINDRICAL ARTICLES
Filed March 14, 1930
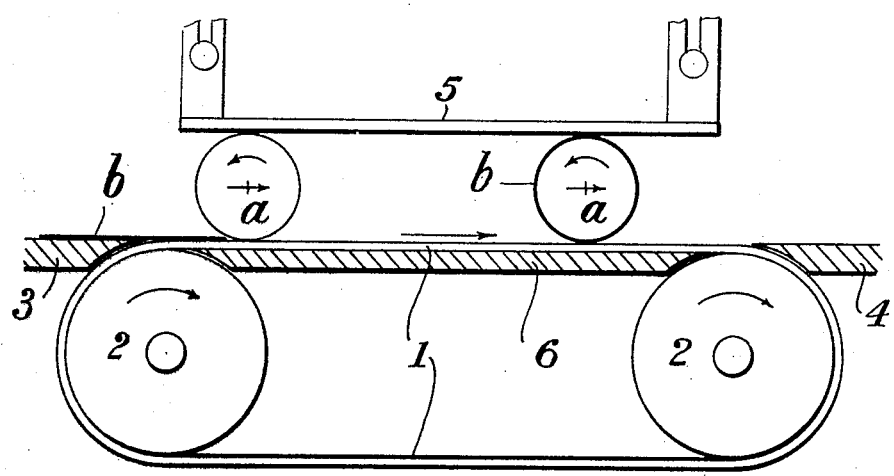
Inventor
Alfred Parr,
by Connolly Bros
Attys Patented Oct. 4, 1932

1,881,125

UNITED STATES PATENT OFFICE

ALFRED PARR, OF LEWISHAM, LONDON, ENGLAND

MACHINE OR DEVICE FOR APPLYING LABELS TO CYLINDRICAL ARTICLES

Application filed March 14, 1930, Serial No. 435,832, and in Great Britain March 15, 1929.

This invention relates to a machine or device for applying labels to cylindrical objects, such as cans, tins, jars, bottles, composite containers and the like, in which food, powders and other products are commonly packed.

In a particular constructional form the machine or device comprises a conveyor consisting of an endless band which may be of any suitable kind, including a chain, or chains, and which is mounted on rollers by means of which motion is communicated to the said band which is in a general way horizontally arranged. The band is supported between the rollers in such a manner that its uppermost surface is kept level or substantially so. Over and parallel with the band I provide a plate preferably mounted in such a manner that its vertical distance from the band may be varied at will but that it shall be immovable in any other direction.

The articles to be labelled are placed on the travelling band with their axes at a right angle with the direction of travel of the band and guides are provided to prevent lateral motion or displacement of said articles while being carried forward on the band.

If the stationary plate is so adjusted that the article on the band is, at the same time, in contact with this plate, the said article will be caused to rotate and at the same time it will be carried forward in the direction of motion of the travelling band but the forward movement of its axis will be less than, say half, the speed at which the band is moving.

Labels to which an adhesive has previously been applied are placed on the travelling band behind the article to which they are to be affixed and as they will be carried forward on the band at say twice the speed at which the said article is moving the label will overtake the said article if the movements be continued and the adhesive will cause it to adhere to and to become wrapped round the said article or partly around it according to the length of the label. By increasing the length of the band and superimposed plate the article may be caused to rotate any desired number of times after receiving the label, so that the label may become firmly pressed onto the said article. The under surface or part of the under surface of the plate may be covered with india-rubber or other resilient material. The article to be labelled and/or the labels may be placed on the travelling band either by hand or by any suitable automatic means.

The inventon is illustrated in the accompaning somewhat diagrammatic drawing, in which an endless conveyor belt or band 1 is driven by rollers 2—2 so as to move continuously between a feed table 3 and delivery table 4. The cylindrical articles, such as $a$—$a$, to be labelled are first placed one by one mechanically or by hand on the feed table end of the belt with their axes parallel with the roller axes, and previously gummed labels, such as $b$ from the feed table, are applied to the belt, one label to each article. The belt carries the articles and the labels to the delivery table, but because the articles engage the under face of a stationary plate 5 they take a rolling motion in opposition to the direction of travel of the belt, so that their forward speed is reduced to half that of the belt and the labels thus catch them up and, as shown on the right hand side of the drawing, became wrapped around them. A table 6 is provided between the rollers in order to support the working part of the belt. The plate 5 is preferably faced on its underside with india-rubber and it is preferably adjustable vertically to suit objects of different diameters.

What I claim is:—

Apparatus for applying adhesive labels to cylindrical articles, comprising an endless conveyor mounted to travel longitudinally and arranged and adapted to receive and convey unapplied labels, an adjustable plate located at a spaced distance above said conveyer and arranged and adapted to contact with the articles and, conjointly with the conveyer, to rotate said articles and to move the same in parallel relation to the conveyer, said apparatus being provided with a feed table in close proximity to the conveyer whereby unattached labels may be fed therefrom to the conveyer at selected and varied intervals.

In testimony whereof I affix my signature.

ALFRED PARR.